(No Model.) 3 Sheets—Sheet 1.

C. W. B. FULLER & J. W. PLUMMER.
HEEL TRIMMING MACHINE.

No. 431,343. Patented July 1, 1890.

WITNESSES:
A. D. Harrison
K. E. Brown

INVENTORS
C. W. B. Fuller
J. W. Plummer
by Wright Brown & Quimby
Attys.

(No Model.) 3 Sheets—Sheet 2.

C. W. B. FULLER & J. W. PLUMMER.
HEEL TRIMMING MACHINE.

No. 431,343. Patented July 1, 1890.

WITNESSES:
INVENTORS (No Model.) 3 Sheets—Sheet 3.
C. W. B. FULLER & J. W. PLUMMER.
HEEL TRIMMING MACHINE.
No. 431,343. Patented July 1, 1890.
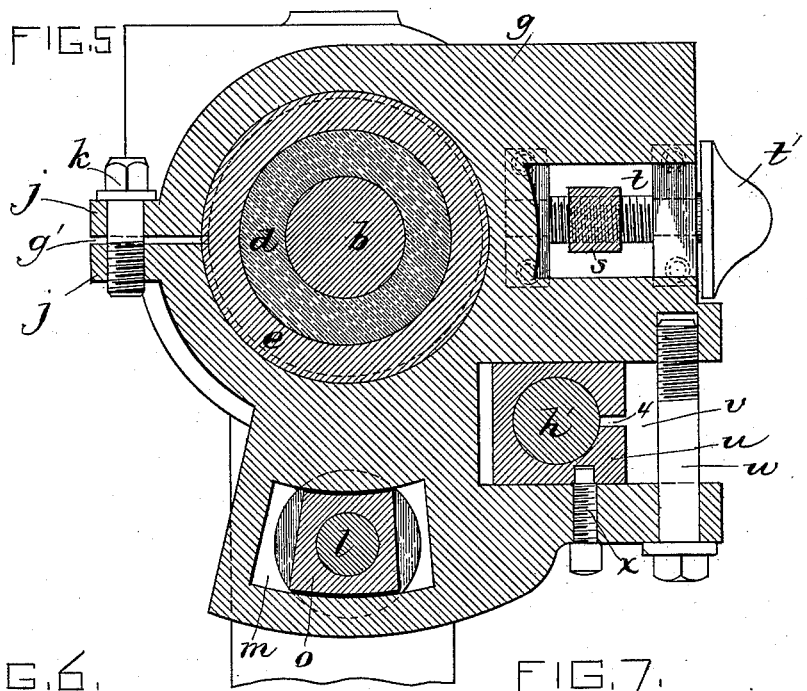
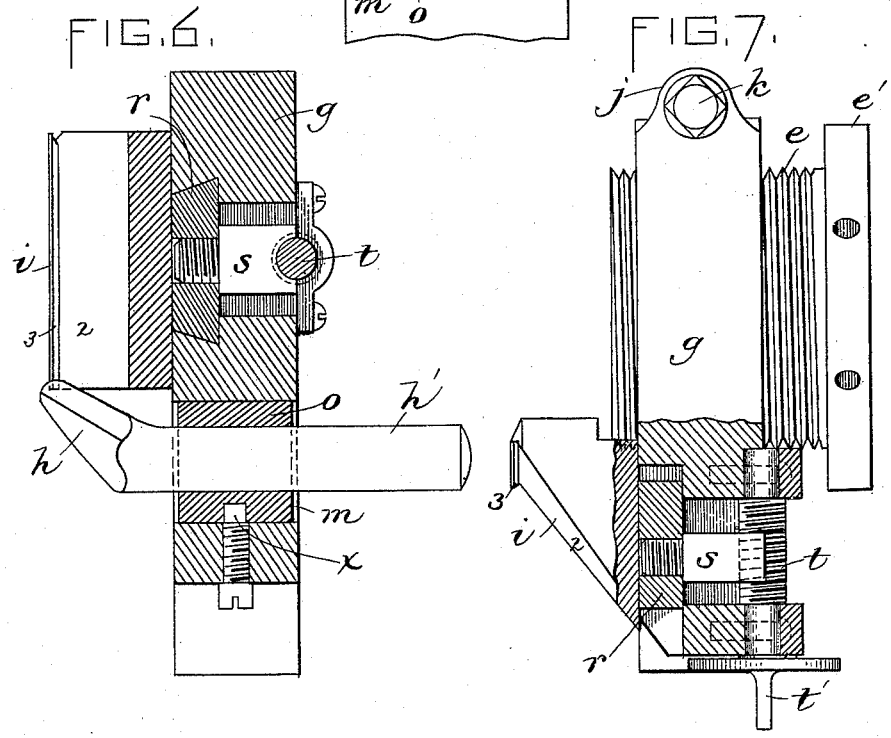
WITNESSES:
A. D. Harrison.
K. E. Brown.
INVENTORS
C. W. B. Fuller
J. W. Plummer
by Wright Brown Knowley
Attys.

UNITED STATES PATENT OFFICE.

CHARLES W. B. FULLER, OF MALDEN, AND JOHN W. PLUMMER, OF SOMERVILLE, ASSIGNORS, BY MESNE ASSIGNMENTS, TO ISAAC P. T. EDMANDS, TRUSTEE, OF BOSTON, MASSACHUSETTS.

HEEL-TRIMMING MACHINE.

SPECIFICATION forming part of Letters Patent No. 431,343, dated July 1, 1890.

Application filed December 6, 1889. Serial No. 332,770. (No model.)

*To all whom it may concern:*

Be it known that we, CHARLES W. B. FULLER, of Malden, and JOHN W. PLUMMER, of Somerville, both in the county of Middlesex and State of Massachusetts, have invented certain new and useful Improvements in Heel-Trimming Machines, of which the following is a specification.

This invention relates to heel-trimming machines employing a rotary cutter, a rest or support for the top lift at one end of said cutter, and a rest for the side of the heel arranged below and in advance of the point where the cutter acts on the work.

The invention has for its object to provide improved means for supporting said rests in their proper relation to the cutter and for adjusting them to various positions; and it consists in the improvements which we will now proceed to describe and claim.

Figure 1:
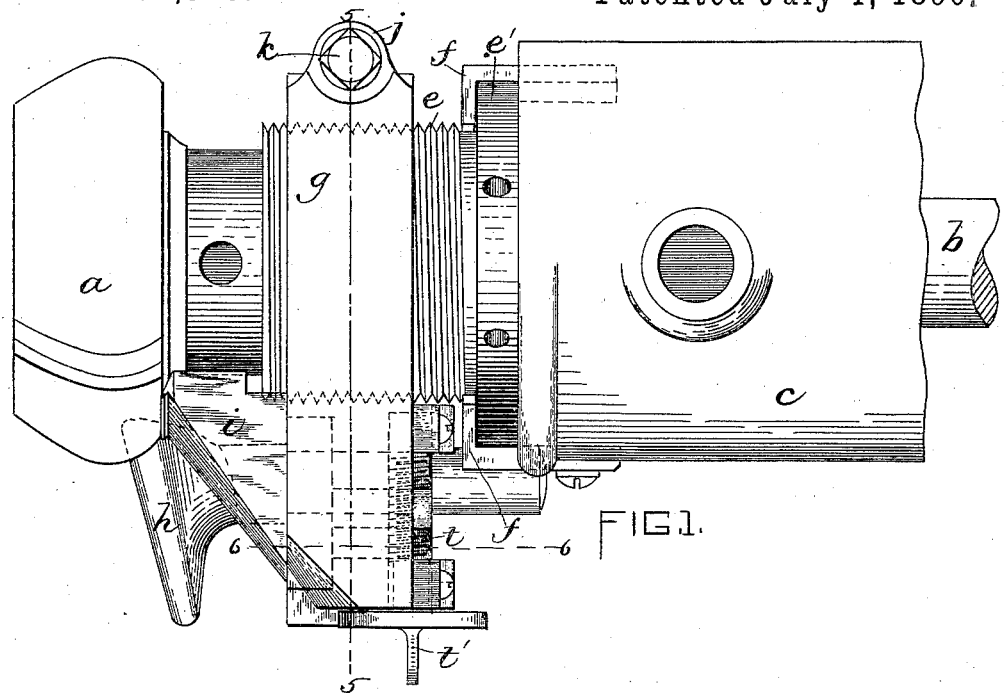
Figure 2:
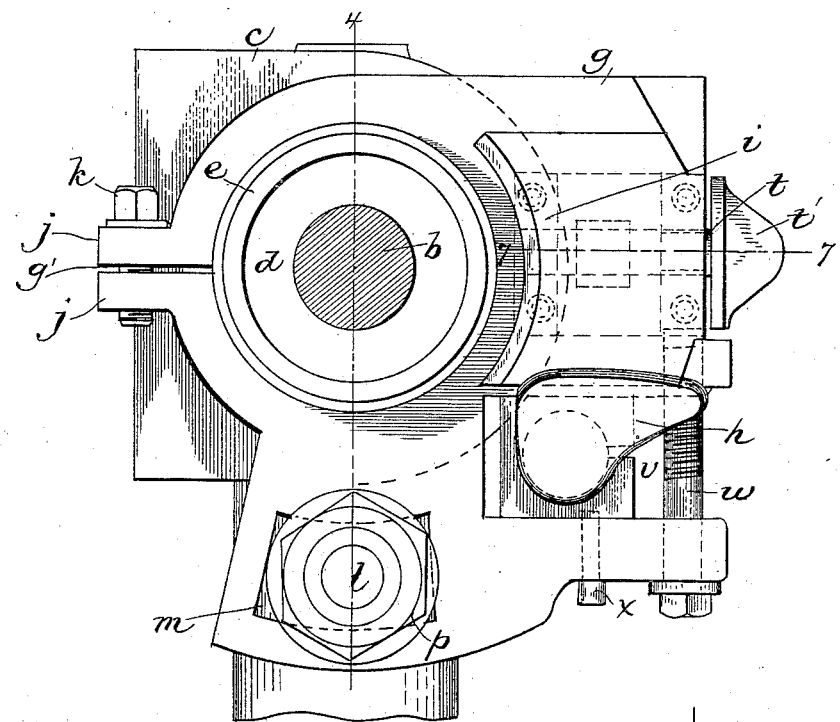
Figure 3:
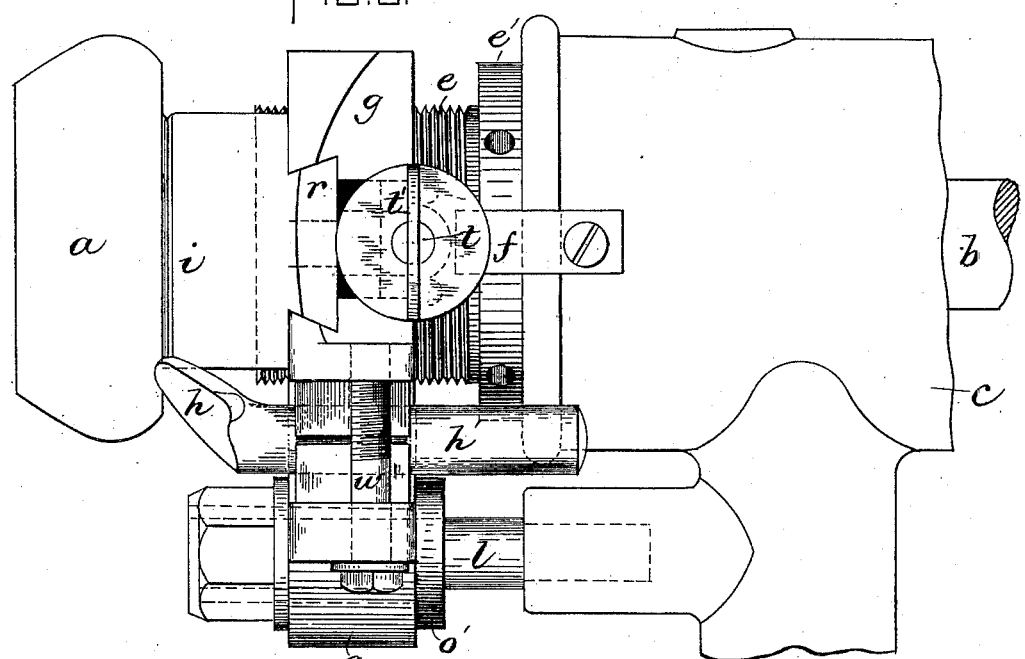
Figure 4:
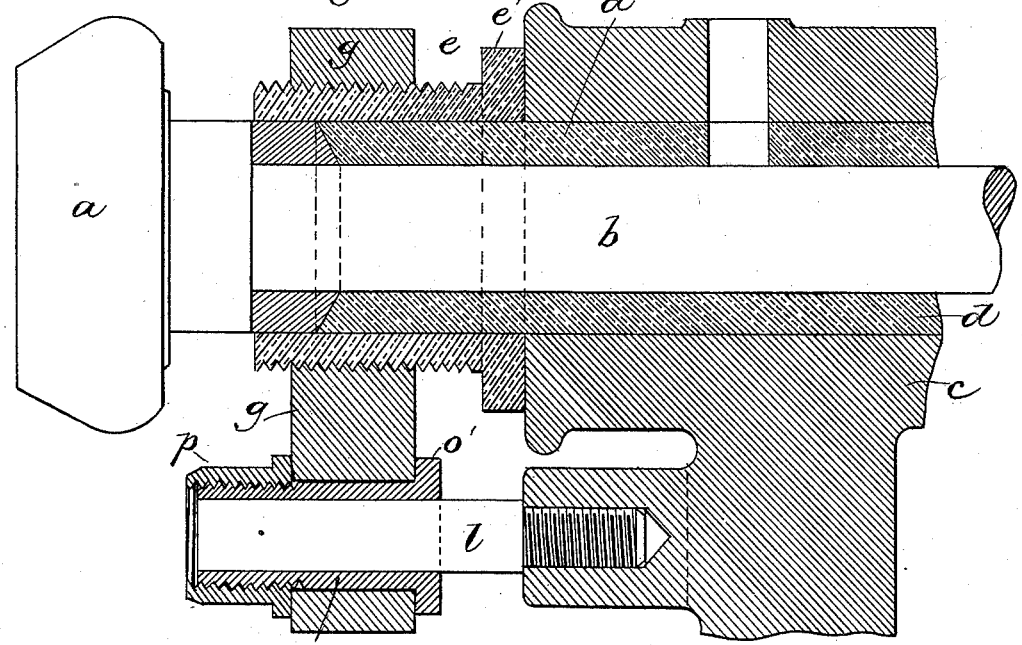

Of the accompanying drawings, forming a part of this specification, Figure 1 represents a top view of the cutter and a portion of its actuating-shaft and of one of the supporting-bearings for the latter, together with the top-lift and heel side-rests and the improved means for supporting and adjusting the same. Fig. 2 represents a side view of the same, the cutter being removed and its shaft shown in section. Fig. 3 represents a front view of the mechanism shown in Fig. 1. Fig. 4 represents a section on line 4 4, Fig. 2. Fig. 5 represents a section on line 5 5, Fig. 1. Fig. 6 represents a section on line 6 6, Fig. 1. Fig. 7 represents a section on line 7 7, Fig. 2.

The same letters of reference indicate the same parts in all the figures.

In the drawings, $a$ represents the rotary cutter, and $b$ the shaft which rotates it. Said cutter may be constructed, for example, as shown in patent to F. N. Ethridge, dated September 17, 1889, No. 411,121, or it may be of any other suitable construction.

$c$ represents a portion of the frame of the machine containing one of the bearings $d$, in which the shaft $b$ rotates.

$e$ represents a cylindrical sleeve, which is mounted to rotate loosely on the bearing $d$, and is provided at one end with a flange $e'$, which is engaged by hooks or lugs $f f$, affixed to the frame $c$, said hooks permitting the sleeve $e$ to rotate, but preventing it from moving endwise on the bearing $d$. The periphery of the sleeve $e$ is screw-threaded and is engaged with a threaded socket formed in an arm $g$, which supports the heel-rest $h$ and top-lift rest $i$, said rests being adjustably secured to the arm, as hereinafter described.

When the sleeve $e$ is rotated and the arm $g$ prevented from rotating, the screw-thread connection between the sleeve and arm causes the arm to be moved laterally, thus moving or adjusting the top-lift and side rests $i h$ horizontally in a direction parallel with the shaft $b$. The described means of adjusting the said rests horizontally parallel with the shaft $b$—viz., an arm supporting the rests and a rotatable screw-threaded sleeve supported by the frame of the machine and engaged with a threaded socket in said arm— is new with us and is an important part of our improvements.

The arm $g$ is divided at $g'$ at one side of the sleeve $e$, and is provided with ears $j j$ at opposite sides of the division. Said ears receive a screw $k$, which may be adjusted to cause the socket portion of the arm $g$ to bind so firmly on the sleeve that the latter cannot rotate in the arm, the arm and sleeve being thus rigidly connected. The object of this construction is to enable the rests $h i$ to be adjusted vertically by swinging the arm up or down, as the case may be. By thus clamping the arm upon the sleeve the latter is caused to turn with the arm, so that when the arm is moved to effect the vertical adjustment of the rests the arm and rests will not be horizontally adjusted in the manner above described, as they would be if the arm and sleeve were not rigidly connected. The arm is held at any desired vertical adjustment by means of a bolt or stud $l$, affixed to the frame $c$ and passing through a segmental slot $m$, Fig. 5, in the lower portion of the arm $g$, a sleeve $o$ on said stud within the slot having a flange $o'$ at one end and screw-threaded at the other end and a nut $p$ engaged with the screw-threaded portion of the sleeve. When said nut is tightened, the arm $g$ is clamped between the nut and the flange $o'$, the arm being thus securely held at any point within the range of adjustment permitted by the slot $m$.

The top-lift rest is a block provided at one side with a segmental face 2, arranged to support the tread surface of the top lift of a heel, and with a narrow lip 3, arranged at an angle to said face to support the edge of the top lift, this being a common form of top-lift rest, as shown in the Ethridge patent above named, and in several earlier patents.

Our improvements in the top-lift rest relate to the means of securing it to and adjusting it upon the arm $g$. On the rear side of the top-lift rest is formed a dovetail rib $r$, Figs. 3 and 6, which is fitted to slide in dovetail guides in the arm $g$. To said rib is attached an arm $s$, the outer end of which is formed as a half-nut to engage one side of the threaded periphery of a screw $t$, which is journaled in bearings on the arm $g$, said screw being adapted to be rotated by a thumb-piece $t'$ on its outer end without moving endwise.

It will be seen that the rotation of the screw $t$ will cause it by its described engagement with the arm $s$ to move said arm and the top-lift rest toward or from the axis of the cutter, the adjustment thus effected adapting the top-lift rest to the diameter of the cutter.

The rest $h$ for the side of the heel is formed on a shank $h'$, which passes through a socket $u$, Fig. 5, fitted in a slot $v$ in the arm $g$, said collar being divided at 4 at one side, so that it can be compressed and caused to bind firmly upon the shank $h'$. The lower side of the slot $v$ is adapted to be pressed upwardly against the socket $u$ to compress the latter by means of a screw $w$, which is screwed into a threaded socket in the upper side of the slot $v$ and passes through the lower side of said slot and has a head bearing on the lower side of the arm $g$. When said screw is loosened, the socket $u$ holds the shank $h'$ loosely, so that the shank may be moved endwise to adjust the heel-rest in a direction parallel with the axis of the cutter; but when said screw is tightened it narrows the slot $v$ sufficiently to compress the socket $u$, and thereby hold the shank $h'$ at any position to which it may be adjusted. The socket $u$ is pivotally connected with the arm $g$ by a stud $x$, which permits the socket to be turned to set the shank $h'$ at any desired angle with the shaft $b$.

It will be seen that by the described devices we are enabled not only to simultaneously adjust the top-lift and heel rests horizontally by rotating the sleeve and vertically by swinging the arm $g$ up or down, but also to adjust each rest independently, the top-lift rest having an independent adjustment toward and from the cutter, while the heel-rest has an independent adjustment parallel with the axis of the cutter and crosswise thereof.

We claim—

1. In a heel-trimming machine, the combination, with a rotary cutter and its shaft, of the fixed bearing $d$, surrounding the shaft, an externally-threaded sleeve surrounding and mounted to rotate loosely on said bearing, means for preventing endwise movement of said sleeve, an arm $g$, having an internally-threaded socket engaged with said threaded sleeve and projecting forward from the sleeve, and a rest attached to the outer end of said arm, said arm being adjustable laterally by the rotation of said sleeve, as set forth.

2. In a heel-trimming machine, the combination, with a rotary cutter and its shaft, of an externally-threaded sleeve surrounding and mounted to rotate loosely on the bearing which supports the shaft, means for preventing endwise movement of said sleeve, a rest-supporting arm having an internally-threaded socket engaged with the sleeve, said socket being split and compressible, and means for compressing the socket, and thereby securing the rest-supporting arm rigidly to the threaded sleeve, as set forth.

3. In a heel-trimming machine, the combination, with a rotary cutter and its shaft, of a fixed bearing $d$, surrounding said shaft, a sleeve rotatable on said bearing, a rest-supporting arm $g$, clamped upon the sleeve and adapted thereby to swing vertically, whereby the outer end of the arm and the rest thereon may be raised or lowered, and means for positively holding the arm at any position to which its swinging end may be vertically moved, as set forth.

4. In a heel-trimming machine, the combination, with a rotary cutter and its shaft, of an externally-threaded sleeve surrounding and mounted to rotate loosely on the bearing which supports said shaft, a rest-supporting arm having an internally-threaded socket engaged with the threaded sleeve, said arm being adjustable laterally by the rotation of the sleeve, a stud $l$, affixed to the supporting-frame and passing through a slot in said arm, a sleeve $o$ on said stud, having a head bearing against one side of the arm, and a nut $p$, engaged with a threaded portion of said sleeve and arranged to bear on the opposite side of the arm, said sleeve being adapted to slide endwise on the stud, and thereby conform to the lateral adjustment of the arm, as set forth.

5. In a heel-trimming machine, the combination of the vertically and laterally adjustable arm $g$, having the top-lift rest fitted to slide in guides on said arm and provided with an arm $s$, formed as a half-nut, and a screw $t$, journaled in bearings in the arm $g$ and engaged with the said half-nut, as set forth.

6. In a heel-trimming machine, the combination of the vertically and laterally adjustable arm $g$, having the compressible slot $v$, open at one end, the split socket $u$, pivoted in said slot, the heel-rest having a shank inserted in said socket, and the screw $w$, whereby the slot and the split socket therein may be compressed to hold the shank at any position to which it may be adjusted.

In testimony whereof we have signed our names to this specification, in the presence of two subscribing witnesses, this 20th day of November, A. D. 1889.

CHARLES W. B. FULLER.
        JOHN W. PLUMMER.

Witnesses:
   C. F. BROWN,
   A. D. HARRISON.